(12) United States Patent
Kim et al.

(10) Patent No.: US 7,571,651 B2
(45) Date of Patent: Aug. 11, 2009

(54) CAPACITIVE PRESSURE SENSOR AND METHOD FOR FABRICATING THE SAME

(75) Inventors: Tae Sic Kim, Daejeon (KR); Sung Ho Lee, Daejeon (KR)

(73) Assignee: Korea Advanced Institute of Science and Technology, Guseong-Dong, Yuseong-Gu, Daejeon (KR)

( * ) Notice: Subject to any disclaimer, the term of this patent is extended or adjusted under 35 U.S.C. 154(b) by 164 days.

(21) Appl. No.: 11/702,149

(22) Filed: Feb. 3, 2007

(65) Prior Publication Data

US 2008/0061799 A1    Mar. 13, 2008

(30) Foreign Application Priority Data

Sep. 8, 2006    (KR) .................... 10-2006-0086897

(51) Int. Cl.
*H01L 27/108* (2006.01)

(52) U.S. Cl. ........................................ 73/756; 257/296

(58) Field of Classification Search ............... 73/718, 73/724, 756; 257/296
See application file for complete search history.

(56) References Cited

U.S. PATENT DOCUMENTS

| | | | |
|---|---|---|---|
| 7,005,694 B2 * | 2/2006 | Amo et al. ............... | 257/296 |
| 7,235,836 B2 * | 6/2007 | Amo et al. ............... | 257/296 |
| 2005/0017284 A1 * | 1/2005 | Amo et al. ............... | 257/301 |
| 2006/0060903 A1 * | 3/2006 | Amo et al. ............... | 257/296 |
| 2007/0032015 A1 * | 2/2007 | Itoh et al. ............... | 438/250 |
| 2007/0246762 A1 * | 10/2007 | Amo et al. ............... | 257/296 |

* cited by examiner

*Primary Examiner*—Andre J Allen
(74) *Attorney, Agent, or Firm*—GWiPS

(57) ABSTRACT

A method for producing a capacitive pressure sensor is comprised steps of: etching front surface and depositing etching stopper on a rear surface of a silicon substrate; depositing an upper electrode on etching stopper; depositing insulating surface on the upper electrode surface; depositing a lower electrode on the insulating surface to form a capacitor; forming a metal pad electrode on the front glass substrate; hybrid-bonding lower electrode of the capacitor of silicon substrate to the metal pad electrode of glass substrate using an anodic bonding method; etching rear surface of silicon substrate bonded to the glass substrate to selectively expose the etching stopper to form a membrane; and removing the exposed region of etching stopper by wet etching. Thus, the output of the capacitive pressure sensor is linearly varied according to the input, which is used hafnium oxide having a high dielectric constant as an insulating material to provide high capacitance and improve the sensitivity.

5 Claims, 3 Drawing Sheets

3A

3B

CAPACITIVE PRESSURE SENSOR AND METHOD FOR FABRICATING THE SAME

BACKGROUND OF THE INVENTION

1. Field of the Invention

The present invention relates to a capacitive pressure sensor, more particularly to a capacitive pressure sensor that has an area that changes according to a variation of the external pressure so that the output changes linearly according to the input, and uses hafnium oxide, which has excellent insulating properties and a high dielectric constant, as an insulating material of a capacitor so as to have high sensitivity, and a method for fabricating said capacitive pressure sensor.

2. Description of the Related Art

Research in semiconductor pressure sensors using a micromachining technique employing a semiconductor fabricating process has been going on for quite some time. Semiconductor pressure sensors obtained by the micromachining technique are widely applied to vehicle systems, industrial control, environmental monitoring, and biomedical diagnosis fields.

Pressure sensors are elements for measuring an absolute pressure or a relative pressure, and are divided into strain gauge-type metal pressure sensors, piezoresistive pressure sensors, piezoelectric pressure sensors, MOSFET pressure sensors, piezojunction pressure sensors, optical fiber pressure sensors, and capacitive pressure sensors, according to sensing principles. The above pressure sensors, except for the metal pressure sensors, are fabricated by the micromachining technique using a semiconductor substance, i.e., silicon.

Capacitive pressure sensors use a principle in which the capacitance of a parallel plate capacitor between a silicon thin film diaphragm (membrane) and a support changes according to a variation of a gap between two electrodes due to the deflection of the silicon thin film diaphragm (i.e., the deformation of the membrane) according to a variation of pressure supplied from the outside.

The above capacitive pressure sensors are classified into absolute pressure sensors and relative pressure sensors. An absolute pressure sensor is a capacitive pressure sensor that is fabricated with an enclosed diaphragm, and thus senses an external pressure on the basis of a designated pressure in a reference pressure chamber. The absolute pressure sensor is completely isolated from the outside, thus it is not influenced by the surrounding environment. However, air in the reference pressure chamber is compressed by the deflection of the diaphragm, generating nonlinearity, and is expanded by an increase in temperature, generating undesirable offset and temperature drift. A relative pressure sensor is a capacitive pressure sensor that has a reference pressure open to the environment through a perforated glass portion, and thus senses the relative pressures of two portions, i.e., a difference of pressures between the upper and lower portions of a diaphragm. The relative pressure sensor is open to the outside, thus being easily influenced by surrounding substances. However, since the reference pressure chamber is not closed, the relative pressure sensor is not influenced by the compression or expansion of the air in the reference pressure chamber.

The capacitive pressure sensors, which detect a capacitance between two electrodes using the deflection of a diaphragm (the deformation of a membrane), have a sensitivity several hundred times as high as piezoresistive pressure sensors, and have higher stability (lower temperature coefficient and stronger structure) and lower power consumption than piezoresistive pressure sensors.

FIG. 1-1A to 1F illustrate a process for fabricating a conventional capacitive pressure S sensor. Since the variation in capacitance according to a variation in pressure is on the order of picofarads, in order to remove a parasitic capacitance between the two electrodes, a lower electrode 14 is formed on a glass substrate 13, an upper electrode 12 is formed on a silicon substrate 11, and the two substrates 13 and 11 are hybrid-bonded using an electric (anodic) bonding method.

First, FIG. 1-1A illustrates the silicon substrate 11 used as an upper substrate. As shown in FIG. 1-1B, the front surface of the silicon substrate 11 is etched to a designated depth by dry etching, and the upper electrode 12 of a capacitor, which is made of a metal, is formed on the etched region.

FIG. 1-1C illustrates the glass substrate 13 used as a lower substrate. As shown in FIG. 3-3D, the lower electrode 14 is formed on the glass substrate 13.

As shown in FIG. 1-1E, the two substrates 11 and 13 provided with the upper and lower electrodes 12 and 14 are hybrid-bonded using the electric (anodic) bonding method.

Finally, as shown in FIG. 1-1F, the rear surface of the silicon substrate 11 is etched by anisotropic chemical etching, thus forming a membrane. Thereby, the fabrication of a capacitive pressure sensor is completed.

The above capacitive pressure sensor electrically reads the change of distance between two electrodes of the capacitor through the movement of the membrane according to a variation of pressure.

The above conventional capacitive pressure sensor has excellent sensitivity and temperature characteristics (i.e., has higher sensitivity and is less sensitive to a variation of temperature) compared to a piezoresistive pressure sensor, thus being applicable to many fields. However, since the capacitance is in inverse proportion to the distance between two electrodes and the membrane does not maintain its planar shape while it moves downward but is bent when external pressure is applied thereto, the variation of capacitance according to a variation of pressure cannot exhibit linearity. That is, the linearity of output according to input is poor, and thus, it is difficult to achieve sensor compensation. Thereby, since the usable pressure range is narrow, the substantial use of the conventional capacitive pressure sensor is restricted.

Accordingly, in order to reduce the nonlinearity of the capacitive pressure sensor, various researches in the structural deformation of the capacitive pressure sensor has been carried out.

Various approaches for deforming the structure of the capacitive pressure sensor have been taken, as follows.

Korean Patent Publication No. 96-006113 discloses a semiconductor capacitive pressure sensor in which a capacitor electrode of a silicon diaphragm is deformed into a cross shape to improve nonlinear response characteristics. Further, Korean Patent Registration No. 10-0404904 discloses a differential capacitive pressure sensor and a method for fabricating the same, in which two sensing capacitors are disposed at both sides and a single-layered sacrificial layer is used to improve nonlinear characteristics of the pressure sensor. The intervals between the upper and lower electrodes of the two sensing capacitors become equal, using the single-layered sacrificial layer to simplify a fabricating process, and variations of capacitance of the sensing capacitors due to displacement become equal to increase the linearity of the pressure sensor.

See Aziz Ettouhami et al. (2004). "A novel capacitive pressure sensor structure with high sensitivity and quasi-linear response". Morocco. Competes rendus. *Mecanique*. pp. 141-162.

In a general capacitive pressure sensor, when a membrane is thin in order to increase the sensitivity of the capacitive pressure sensor, the linearity of the capacitive pressure sensor is deteriorated. However, Aziz Ettouhami et al. solve the above nonlinearity problem using a series capacitor, thus improving the sensitivity and the linearity of a capacitive pressure sensor.

Further, see Satoshi Yamamoto et al. (2003). "Touch mode capacitive pressure sensor for passive tire monitoring system". Japan. IEEJ Transactions on Sensors and Micro machines. pp. 9-15.

Satoshi Yamamoto et al. disclose a capacitive pressure sensor having high linearity, in which the distance between two electrodes of a capacitor is changed according to a variation of pressure. Such a capacitive pressure sensor has a principle in that, when pressure of a designated value or more is applied to the capacitive pressure sensor, the upper electrode, i.e. the membrane, contacts an insulating material deposited on the lower electrode.

SUMMARY OF THE INVENTION

Therefore, the present invention has been made in view of the above problems, and it is an object of the present invention to provide a capacitive pressure sensor, in which the distance between two electrodes of a capacitor is not changed but the area of the pressure sensor is changed according to a variation of pressure, so that output changes linearly according to input, and hafnium oxide, having excellent insulating properties and a high dielectric constant, is used as an insulating material of the capacitor to increase the capacitance and thus to increase the sensitivity. It is another object of the present invention to provide a method for fabricating said capacitive pressure sensor.

In accordance with one aspect of the present invention, the above and other objects can be accomplished by the provision of a method for fabricating a capacitive pressure sensor comprising: etching the front surface of a silicon substrate to a designated depth; depositing an etching stopper, for stopping etching of the rear surface of the silicon substrate, on the surface of the silicon substrate; depositing an upper electrode of a capacitor on the surface of the etching stopper; depositing an insulating surface of the capacitor on the surface of the upper electrode; depositing a lower electrode of the capacitor on the surface of the insulating surface to form the capacitor; forming a metal pad electrode on the front surface of a glass substrate; hybrid-bonding the lower electrode of the capacitor of the silicon substrate to the metal pad electrode of the glass substrate using an electric (anodic) bonding method; etching the rear surface of the silicon substrate bonded to the glass substrate to selectively expose the etching stopper and thus to form a membrane; and removing the exposed region of the etching stopper by wet etching.

During the etching of the front surface of the silicon substrate, anisotropic chemical etching using potassium hydroxide (KOH) or ethylene diamine pyrocatechol (EDP) may be performed and silicon nitride (SixNy), silicon dioxide (SiO2) or a metal, selected from the group consisting of gold (Au) and chromium (Cr), may be used as a mask material.

Alternatively, in the etching of the front surface of the silicon substrate, dry etching may be performed and photoresist or a metal, selected from the group consisting of gold (Au), chromium (Cr) and aluminum (Al), may be used as a mask material.

The etching stopper, for stopping the etching of the rear surface of the silicon substrate by anisotropic chemical etching using potassium hydroxide (KOH) or ethylene diamine pyrocatechol (EDP), may be made of silicon dioxide (SiO2), during the depositing of the etching stopper.

The upper electrode may be made of doped polysilicon, during the depositing of the upper electrode of the capacitor.

The insulating layer may be made of hafnium oxide, during the depositing of the insulating layer of the capacitor.

The lower electrode may be made of doped polysilicon, during the depositing of the lower electrode.

The rear surface of the silicon substrate may be etched by anisotropic chemical etching, during the etching of the rear surface of the silicon substrate, and thus the capacitor may be formed in the shape of the membrane having a three-layer structure moving according to a variation of pressure, during the removing of the exposed region of the etching stopper.

In accordance with another aspect of the present invention, there is provided a capacitive pressure sensor fabricated by the above method.

The above capacitive pressure sensor of the present invention is characterized in that the capacitor is formed in the shape of the membrane having a three-layer structure, the area of the capacitor is changed according to a variation of external pressure, and hafnium oxide, having excellent insulating properties and a high dielectric constant, is used as the insulating layer.

BRIEF DESCRIPTION OF THE DRAWINGS

FIG. 1-1A to 1F are sectional views illustrating a process for fabricating a conventional capacitive pressure sensor.

FIG. 2-2A to 2K are sectional views illustrating a process for fabricating a capacitive pressure sensor in accordance with the present invention.

FIGS. 3-3A and 3B are schematic sectional views illustrating the operation of the capacitive pressure sensor in accordance with the present invention.

DESCRIPTION OF THE PREFERRED EMBODIMENTS

Now, a preferred embodiment of the present invention will be described in detail with reference to the annexed drawings.

Hereinafter, a method for fabricating a capacitive pressure sensor having high linearity in accordance with the present invention will be described with reference to FIG. 2-2A to 2K.

Figure 1:
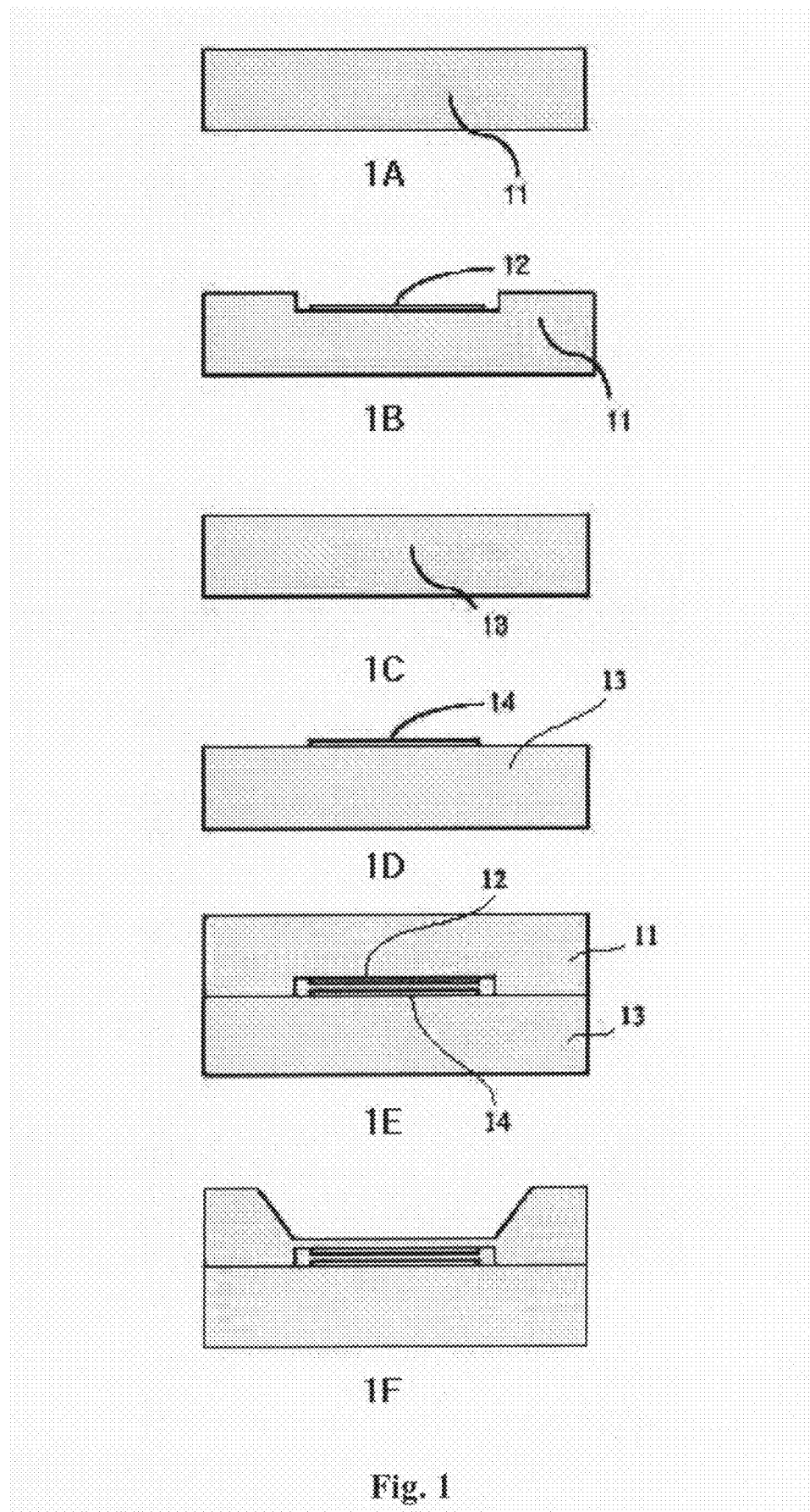
Figure 2:
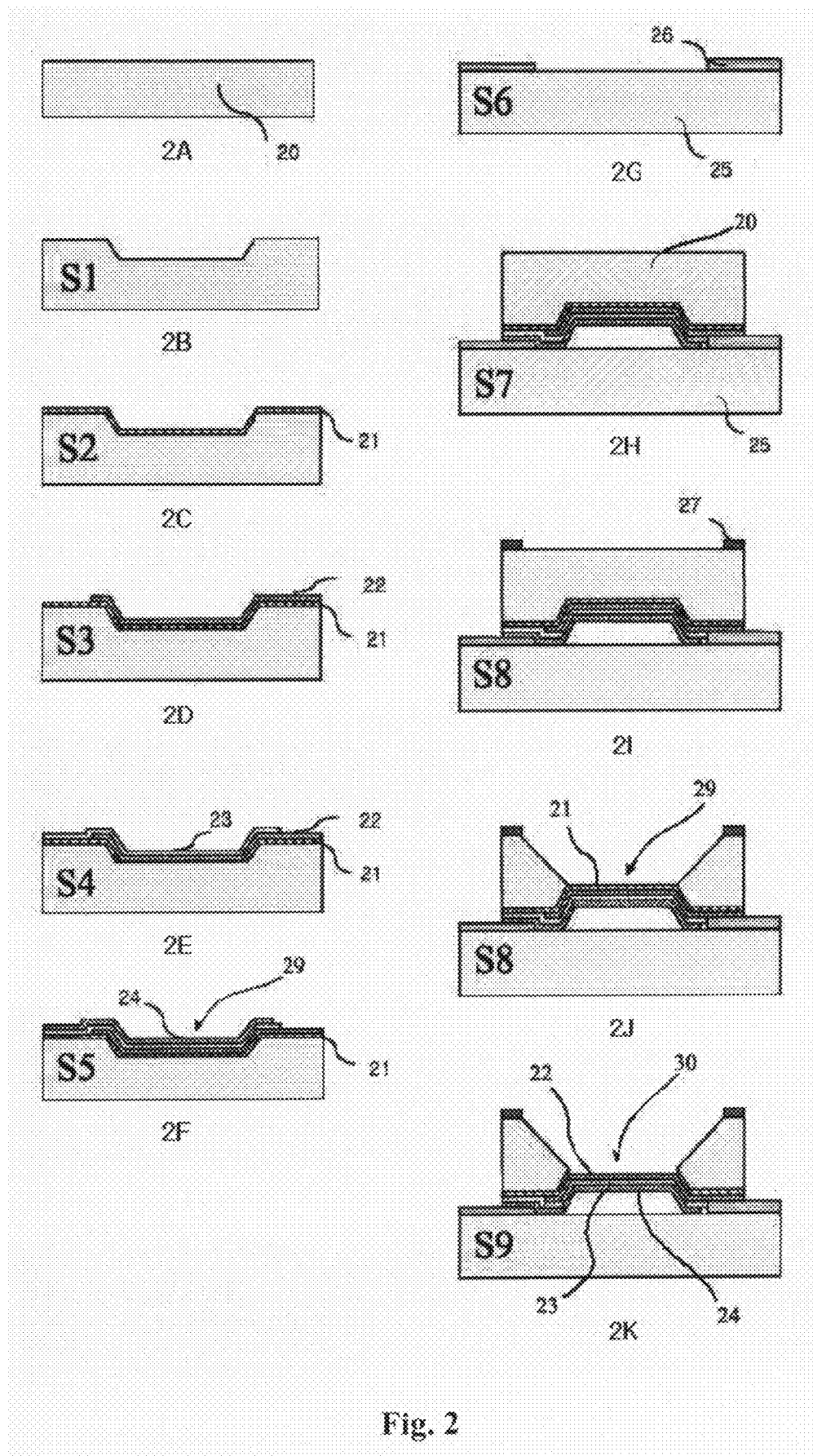

First, as shown in FIG. 2-2A to 2K, a silicon substrate 20 is used to form a membrane 30, and a glass substrate 25 is used to form a bonding metal pad electrode 26.

As shown in FIG. 2-2A, the silicon substrate 20 is prepared. As shown in FIG. 2-2B, the front surface of the silicon substrate 20 is etched to a designated depth in a first step (S1). Here, when anisotropic chemical etching using potassium hydroxide (KOH) or ethylene diamine pyrocatechol (EDP) is performed, silicon nitride (SixNy), silicon dioxide (SiO2), or a metal, such as gold (Au) or chromium (Cr), is used as a mask material, or when dry etching is performed, photoresist, or a metal, such as gold (Au), chromium (Cr), or aluminum (Al), is used as a mask material.

As shown in FIG. 2-2C, silicon dioxide (SiO2) is deposited on the etched surface of the silicon substrate 20 in a second step (S2), thus forming an etching stopper 21 for stopping anisotropic chemical etching using potassium hydroxide (KOH) or ethylene diamine pyrocatechol (EDP), which will be later described in an eighth step (S8).

As shown in FIG. 2-2D, doped polysilicon is deposited on the surface of the etching stopper 21, thus forming an upper electrode 22 of a capacitor, in a third step (S3). Thereafter, as shown in FIG. 2-2E, in order to increase the sensitivity of the pressure sensor, hafnium oxide having excellent insulating properties and a high dielectric constant is deposited on the surface of the upper electrode 22, thus forming an insulating layer 23, in a fourth step (S4). Since the hafnium oxide has excellent insulating properties, the use of an insulating layer 23 with a small thickness increases the capacitance of the capacitor 29.

As shown in FIG. 2-2F, doped polysilicon is deposited on the insulating layer 23, thus forming a lower electrode 24 of the capacitor 29, in a fifth step (S5). Thereby, the formation of the capacitor 29 is completed.

As shown in FIG. 2-2G, a metal pad electrode 26 is formed on the front surface of the glass substrate 25 in a sixth step (S6). Thereafter, as shown in FIG. 2-2H, the lower electrode 24 of the capacitor 29 of the silicon substrate 20 and the metal pad electrode 26 of the glass substrate 25 are hybrid-bonded using an electric (anodic) bonding method in a seventh step (S7).

As shown in FIGS. 2-2I and 2J, in order to form the capacitor 29, of the silicon substrate 20 bonded to the glass substrate 25, in the shape of the membrane 30, the rear surface of the silicon substrate 20 is etched by anisotropic chemical etching using potassium hydroxide (KOH) or ethylene diamine pyrocatechol (EDP), thus selectively exposing the etching stopper 21, in the eighth step (S8). Here, silicon nitride (SixNy), silicon dioxide (SiO2), or a metal, such as gold (Au) or chromium (Cr), is used as a mask material, and silicon dioxide (SiO2) is used as the etching stopper 21.

Finally, in a ninth step (S9) shown in FIG. 2-2K, the portion of the etching stopper 21 that was exposed from the surface of the capacitor 29 by the anisotropic chemical etching in the eighth step (S8), is removed by wet etching, forming the membrane 30 having a three-layer structure, which moves according to a variation of pressure. Through the above steps, the fabrication of the capacitive pressure sensor of the present invention is completed.

The membrane 30 having the above three-layer structure includes the upper electrode 22, the insulating layer 23, and the lower electrode 24.

Figure 3:
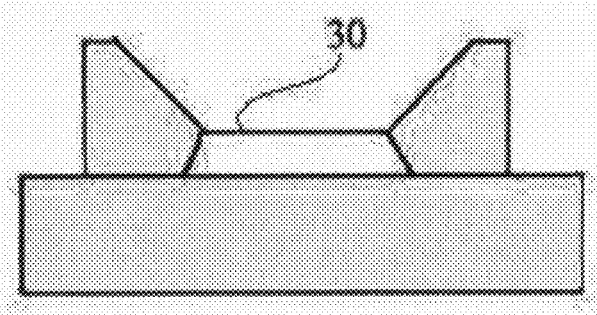
Figure 3:
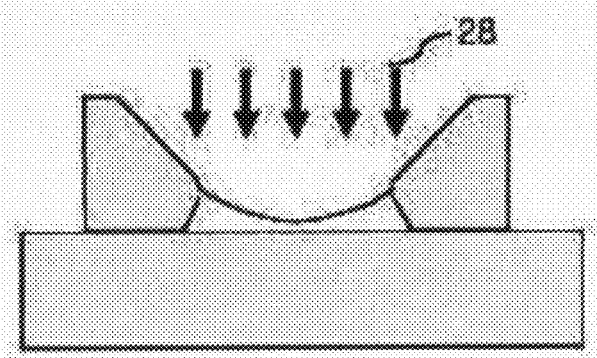

FIGS. 3-3A and 3B are schematic sectional views illustrating the operation of the capacitive pressure sensor of the present invention, which is fabricated by the above method.

When external pressure is not applied to the membrane 30, the membrane 30 maintains its level state, as shown in FIG. 3-3A, and when external pressure is applied to the membrane 30, the membrane 30 is concavely bent into an arched state and thus has an increased area, as shown in FIG. 3-3B. Since the area of the membrane 30 means the area of the capacitor, the capacitance of the capacitor is changed.

The capacitance is in proportion to the area of the membrane 30, and when external pressure is applied to the membrane 30, the membrane 30 is bent from the planar state into a concave arch. Accordingly, the variation of capacitance according to the variation of pressure exhibits linearity.

As apparent from the above description, the present invention provides a method for fabricating a capacitive pressure sensor that has an area changed according to a variation of external pressure so that output changes linearly according to input, and uses hafnium oxide, having a high dielectric constant, as an insulating material to increase the capacitance and thus to increase the sensitivity, and a capacitive pressure sensor fabricated thereby, thus allowing the capacitive pressure sensor to have high linearity and sensitivity.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A method for manufacturing a capacitive pressure sensor, the method comprising steps of:
   etching a front surface of a silicon substrate to a designated depth,
   depositing an etching stopper on a rear surface of the silicon substrate to stop etching the rear surface,
   depositing an upper electrode of a capacitor on the surface of the etching stopper, wherein said upper electrode is made of doped polysilicon,
   depositing an insulating layer of the capacitor on the surface of the upper electrode, wherein said insulating layer is made of hafnium oxide,
   depositing a lower electrode of the capacitor on the surface of the insulating layer to form the capacitor, wherein said lower electrode is made of doped polysilicon,
   forming a metal pad electrode on the front surface of a glass substrate,
   hybrid-bonding the lower electrode of the capacitor of the silicon substrate to the metal pad electrode of the glass substrate using an electric (anodic) bonding method,
   etching a rear surface of bonded silicon substrate to the glass substrate for selectively exposing the etching stopper to form a membrane, wherein the rear surface of the bonded silicon substrate is etched by anisotropic chemical etching, and
   removing the exposed region of the etching stopper by wet etching, so that the capacitor is formed a shape of membrane having three-layer structure to be highly sensitive for a pressure variation.

2. The method according to claim 1, wherein said etching step of the front surface of the silicon substrate further comprising, anisotropic chemical etching using potassium hydroxide (KOH) or ethylene diamine pyrocatechol (EDP) is performed and silicon nitride (SixNy), silicon dioxide (SiO2) or a metal selected from the group consisting of gold (Au) and chromium (Cr) is used as a mask material.

3. The method according to claim 1, wherein said etching step of the front surface of the silicon substrate further comprising, dry etching is performed, and photoresist or a metal selected from the group consisting of gold (Au), chromium (Cr) and aluminum (Al) is used as a mask material.

4. The method according to claim 1, wherein said depositing step of the etching stopper, which is made of silicon dioxide (SiO2), further comprising, anisotropic chemical etching using potassium hydroxide (KOH) or ethylene diamine pyrocatechol (EDP) is used to stop etching the rear surface of the bonded silicon substrate.

5. An apparatus for manufacturing a capacitive pressure sensor comprising:
   means for etching a front surface of a silicon substrate to a designated depth,
   means for depositing an etching stopper on a rear surface of the silicon substrate to stop etching the rear surface,
   means for depositing an upper electrode of a capacitor on the surface of the etching stopper, wherein said upper electrode is made of doped polysilicon,
   means for depositing an insulating layer of the capacitor on the surface of the upper electrode, wherein said insulating layer is made of hafnium oxide,
   means for depositing a lower electrode of the capacitor on the surface of the insulating layer to form the capacitor, wherein said lower electrode is made of doped polysilicon, means for forming a metal pad electrode on the front surface of a glass substrate;

means for hybrid-bonding the lower electrode of the capacitor of the silicon substrate to the metal pad electrode of the glass substrate using an electric (anodic) bonding method, means for etching a rear surface of bonded silicon substrate to the glass substrate for selectively exposing the etching stopper to form a membrane, wherein the rear surface of the bonded silicon substrate is etched by anisotropic chemical etching, and means for removing the exposed region of the etching stopper by wet etching, so that the capacitor is formed a shape of membrane having three-layer structure to be highly sensitive for a pressure variation.

* * * * *